July 12, 1966 W. R. BONWIT ETAL 3,259,992
METHOD AND APPARATUS FOR WINDING STACKS OF SHEETS
Filed May 28, 1962 8 Sheets-Sheet 1

INVENTORS
WILLARD R. BONWIT
MOSHE SEGAL
BY JOHN J. HARTLOVE
WILLIAM E. SCHERER
ATTORNEY

Fig. 2.

INVENTORS
WILLARD R. BONWIT
MOSHE SEGAL
BY  JOHN J. HARTLOVE
WILLIAM E. SCHERER

ATTORNEY

July 12, 1966 W. R. BONWIT ETAL 3,259,992
METHOD AND APPARATUS FOR WINDING STACKS OF SHEETS
Filed May 28, 1962 8 Sheets-Sheet 3

INVENTORS
WILLARD R. BONWIT
MOSHE SEGAL
MOSHE SEGAL
JOHN J. HARTLOVE
WILLIAM E. SCHERER
BY
ATTORNEY

July 12, 1966   W. R. BONWIT ETAL   3,259,992
METHOD AND APPARATUS FOR WINDING STACKS OF SHEETS
Filed May 28, 1962   8 Sheets-Sheet 4

INVENTORS
WILLARD R. BONWIT
MOSHE SEGAL
JOHN J. HARTLOVE
WILLIAM E. SCHERER
BY
ATTORNEY

United States Patent Office 3,259,992
Patented July 12, 1966

3,259,992
METHOD AND APPARATUS FOR WINDING STACKS OF SHEETS

Willard R. Bonwit, Rydal, Pa., Moshe Segal, Kew Gardens, N.Y., and John J. Hartlove and William E. Scherer, Baltimore, Md., assignors to The Lord Baltimore Press, Incorporated, Baltimore, Md., a corporation of Maryland
Filed May 28, 1962, Ser. No. 197,952
9 Claims. (Cl. 34—23)

The present invention relates to a winding machine and more particularly to an improved winding mechanism for passing air between printed sheets to dry the ink.

Heretofore printed sheets have been winded by assembling them in stacks and by manual riffling or flipping of the sheets so that the ink dries. If the stacks are large enough, it usually requires two men to manually riffle the sheets. Since only a small number of sheets can be riffled at one time, the operation of winding a whole stack is time consuming and expensive. Furthermore, since the success of the riffling operation depends upon the experience of the operators and the care taken by the operators to riffle the sheets, the results may not be entirely satisfactory.

The present invention eliminates these disadvantages and has for one of its objects the provision of an improved winding mechanism for passing air through a large stack of sheets.

Another object of the present invention is the provision of an improved winding mechanism for winding a whole stack of paperboard or paper without manually handling any of the sheets.

Another object of the present invention is the provision of an improved winding mechanism which will automatically align a stack of sheets with a skid.

Another object of the present invention is the provision of an improved winding mechanism which will permit easy removal of a support board on which the sheets are stacked.

Another object of the present invention is the provision of an improved winding mechanism which will permit the stack to be easily inverted.

Another object of the present invention is the provision of an improved winding mechanism which will permit groups of defective sheets to be removed from the stack without disturbing the other sheets in the stack.

Another object of the present invention is the provision of an improved simple and inexpensive method of winding a stack of sheets.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 8 is a sectional view taken along line 8—8 of FIG. 7 showing the winding mechanism;

FIG. 9 is an end view of the winding mechanism used in accordance with the present invention;

For convenience the invention will first be described generally and details of construction will be described under separate headings.

GENERAL DESCRIPTION

Referring more particularly to FIGS. 13 to 17 which show the method of operation of the present invention, a stack of printed sheets 1 is loaded on the usual skid 2 in any desired or conventional manner. The skid 2 together with the stack 1 is loaded onto a skid inverter 3 having the usual rails 4, a bottom plate 5, a back plate 6 and an upper movable clamping plate 7.

The skid 2 is mounted on the bottom plate 5 with the inner edge 8 of the stack 1 as close as possible to the back plate 6. The top clamping plate 7 is then moved down into clamping position (FIG. 14) and the skid inverter is then rotated about 90° so that the stack 1 has its inner edge 8 resting on back plate 6. A suitable winding mechanism 9, adapted to blow air against the stack and between the sheets from the sides and top of the stack, is moved across the edges of the stack. The air will move freely between the sheets to dry them.

During the winding operation, it is important that the stack of sheets be neither too tight nor too loose. If the sheets are too tight, the air cannot pass between them, whereas if the sheets are too loose the sheets will buckle.

Figure 16:
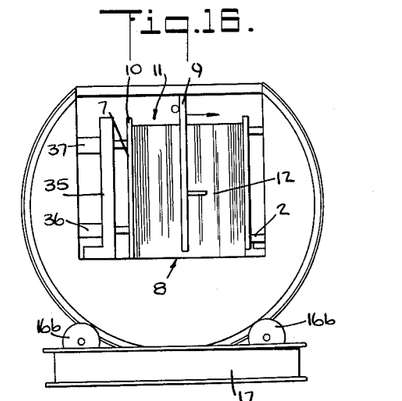
FIG. 16 is a similar view showing the position of the stack when the central portion of the stack is to be winded.
Figure 17:
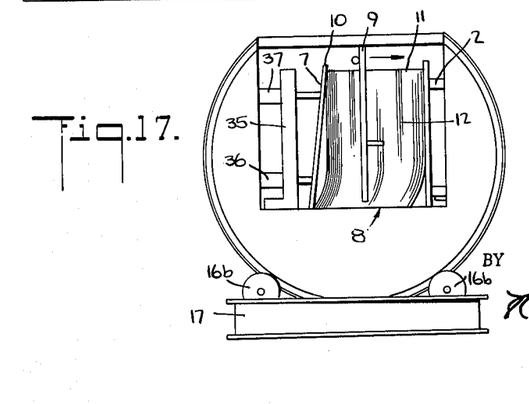
FIG. 17 is a similar view showing the position of the stack when the inner portion of the stack is to be winded.

In order to control the tightness of the stack, the top clamping plate 7 is angularly adjustable by a suitable mechanism which will be described in greater detail hereinbelow. Thus, the top clamping plate 7 may be tilted in one direction (FIG. 15) or may be substantially vertical (FIG. 16) or may be tilted in the opposite direction (FIG. 17). The angular adjustment of the top clamping plate 7 serves to insure that the sheets in the stack 1 are sufficiently loose for air to pass between them but are tight enough to prevent severe buckling.

Figure 15:
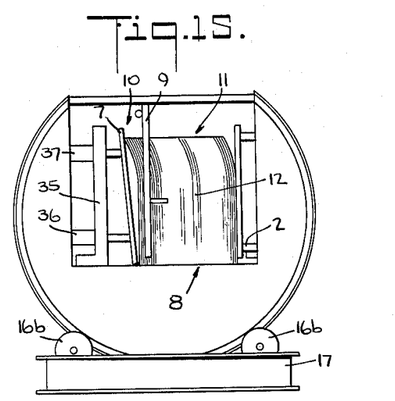
FIG. 15 is a similar view showing the position of the stack when the outer portion of the stack is to be winded.

It will be understood that the angle to which the top clamping plate 7 is tilted in order to give the best performance depends upon the stiffness and other characteristics of the sheets in the stack 1. FIGS. 15 to 17 represent one manner of winding the stack which has been found successful. The top clamping plate 7 is first tilted with its outer edge 10 pointing away from the stack 1. The angle of the tilt may be between 2½° to 7½° from the vertical. This will permit the stack 1 to bend adjacent the outer edge 11 as shown in FIG. 15 so that the portion of the sheets adjacent outer edge 11 of the stack 1 are loose. The winding mechanism 9 is then passed over the stack so that air enters the outer portions of the sheets adjacent the outer edge 11 of the stack 1 to wind this portion of the sheets.

Thereafter the top clamping plate 7 may be moved to its vertical position (FIG. 16) so that the central portion 12 of the sheets in the stack (between inner and outer edges 8 and 11) are loose and the winding mechanism 9 is again passed thereover to wind the central region 12 of the sheets.

In order to wind the portion of the sheets adjacent inner edge 8 of stack 1, the top plate 7 is tilted so that its outer edge 10 is closer to the stack as shown in FIG. 17. The extent of the tilt may be between 2½° and 7½° to the vertical. The portion of the sheets in the stack adjacent inner edge 8 of the stack are now loose and the winding mechanism 9 is again moved over the stack to inject air between the lower portion of the sheets adjacent the inner edge 8 of the stack. As will be more fully discussed hereinafter, it will be understood that the above describes only a procedure which has been found successful with certain types of sheets and that this procedure may be changed in accordance with the characteristics of the sheets.

It will thus be seen that the present invention will wind a stack of sheets without the sheets being individually riffled so as to give a faster and more accurate operation.

SKID INVERTER

The skid inverter 3 which may be used with the present invention is shown in detail in FIGS. 1 to 6 and comprises the usual U-shaped frame 15 comprising back supports 15a on which is mounted the rear plate 6, bottom supports 15b on which is mounted bottom plate 5 and top supports 15c on which is mounted the movable clamping plate 7.

Figures 1, 22:
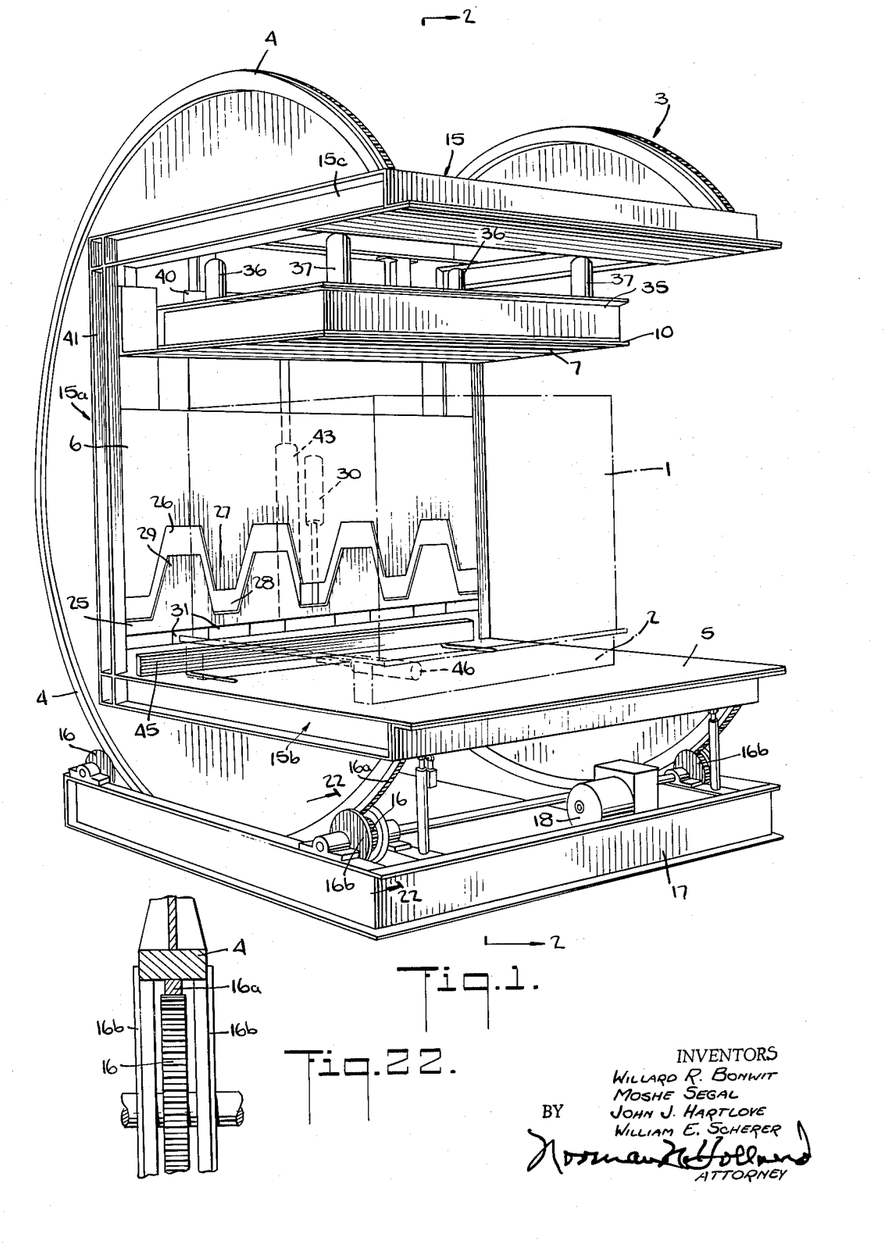
FIG. 1 is a perspective view of the improved winding machine made in accordance with the present invention.
FIG. 22 is a sectional view taken along line 22—22 of FIG. 1.

The preferred means for rotating the skid inverter is seen in detail in FIG. 22 and comprises a drive gear 16 driven by any suitable means, such as a drive motor 18, adapted to mesh with a gear rack 16a mounted on each rail 4. Thus rotation of the drive gear 16 by motor 18 rotates the skid inverter. A pair of support trunnions 16b flank each side of the drive gear and are in friction contact with the rail 4 in order to support the weight of the skid inverter. It will of course be understood that other means for rotating the skid inverter may also be used, as may be desired.

Preferably the skid inverter 3 is placed in a pit 19 (FIG. 2), so that the bottom plate 5 is on the same level as the floor 20 to thereby facilitate the loading of a stack 1 into the skid inverter 3.

Figure 7:
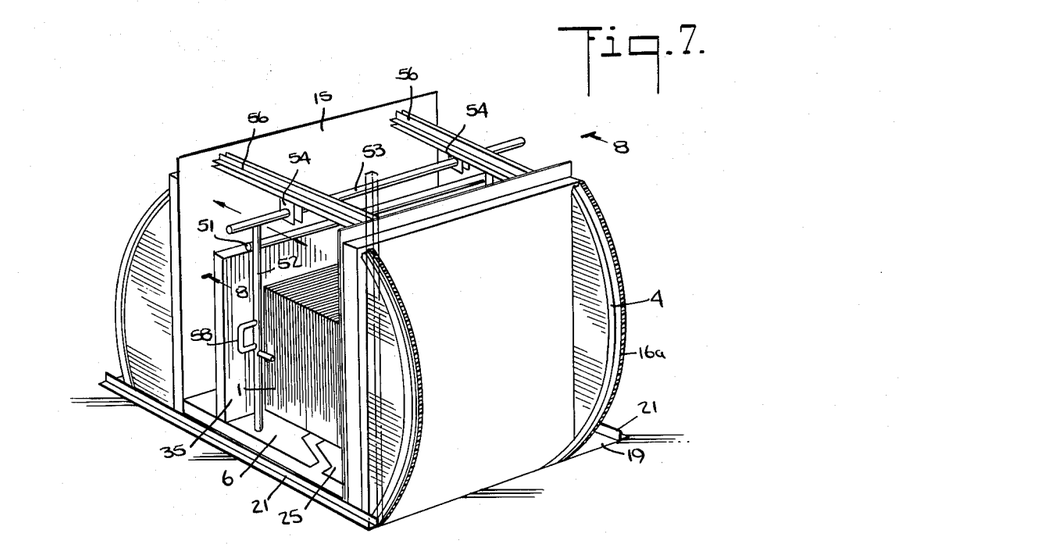
FIG. 7 is a perspective view showing the winding mechanism of the present invention in operative position on the skid inverter.

A suitable safety switch (not shown) controlled by two bars 21, one on each side of the machine (as shown in FIG. 7) is provided which closes the electrical circuit which controls the operation only when the two bars 21 are in their lowest position. The bars 21 are L-shaped so as to seal the space between the pit 19 and the skid inveter 3 and prevent workmen's feet from slipping into the open space.

The lower edge of the back plate 6 is provided with alternating slots 26 and teeth 27 and is provided with a lower movable extension 25 which also has alternating slots 28 and teeth 29 adapted to mesh with the slots 26 and teeth 27 in the lower edge of the stationary back plate 6. The lower extension 25 is vertically movable under the control of fluid cylinders 30 mounted on frame member 15a. This permits the height of back plate 6 to be adjusted depending on the height of the stack 1 so that when the stack 1 is rotated 90° all the sheets in the stack will be supported by the back plate 6 and its movable extension 25.

In addition, the vertically movable lower extension 25 is provided with a plurality of spring loaded lugs which will straddle the space between the skid and the stack when a delivery board 32 on which the stack 1 may be mounted is easily removed, as will be discussed in greater detail hereinbelow.

The top frame element 15c of the skid inverter 3 is provided with a vertically movable upper frame member 35 on which is mounted a rear pair of top plate control cylinders 36 and a front pair of top plate control cylinders 37. The top clamping plate 7 depends from piston rods 38 and 39 extending from control cylinders 36 and 37, respectively.

The movable frame 35 extends from a slide 40 mounted for vertical movement in grooves 41 in frame member 15a by means of rollers 42. A master cylinder 43 controls the vertical movement of the slide 40 and with it the movement of movable frame member 35.

A skid control channel 45 is located beneath the rear plate 6 and is movable inwardly or outwardly by a cylinder 46 located below the lower plate 5 to permit the skid to be aligned with the stack 1, as will be more fully discussed hereinafter.

It will be seen that with the present structure a stack of sheets 1 together with the skid 2 on which they rest is placed between the bottom plate 5 of the skid inverter 3 and is clamped in place by first lowering the movable frame 35 to the desired height and then lowering the upper clamping plate 7 until it rests with light pressure on stack 1.

WINDING MECHANISM

The winding mechanism 9 of the present invention is shown in detail in FIGS. 7, 8 and 9 and comprises a U-shaped hollow tube 50 having a base portion 51 and a pair of leg portions 52 extending therefrom. Spaced air openings 55 are provided along the base portion 51 and the two legs 52 to inject air between the sheets in the stack 1 as will be more fully discussed hereinafter.

The U-shaped tube assembly consisting of tubes 50 and 52 depends from a conduit 53 which communicates with the interior of said U-shaped tube assembly to supply air thereto. The tube 50 is adapted to straddle the stack 1 so that air passes from its base 51 and legs 52 and is injected between the sheets in the stack from the upper edge and the two side edges thereof. Tubes 50 and 52 are adjustable up and down, and in and out, respectively, to air properly any size stack of sheets.

The conduit 53 depends from a pair of hanger brackets 54 which are adapted to move in a pair of tracks 56 by means of rollers 57. The tracks 56 are supported in place between the upper plate 7 and lower plate 5 of the skid inverter (FIG. 7). Handles 58 may be provided to facilitate the movement of the U-shaped winding tube 50 over the stack 1.

With this structure, after the skid inverter 3 is rotated 90° to the position shown in FIG. 7, the tracks 56 are mounted between upper plate 7 and lower plate 5 to position the winding mechanism 9 in its straddling position. The winding mechanism 9 is then moved over the stack and air is admitted thereto through conduit 53 so that air is injected out of the air openings 55 from the base 51 and from the legs 52 and is passed between the sheets of stack 1 to wind the sheets.

CONDUIT ADJUSTING MECHANISM

Figures 10, 11, 12:
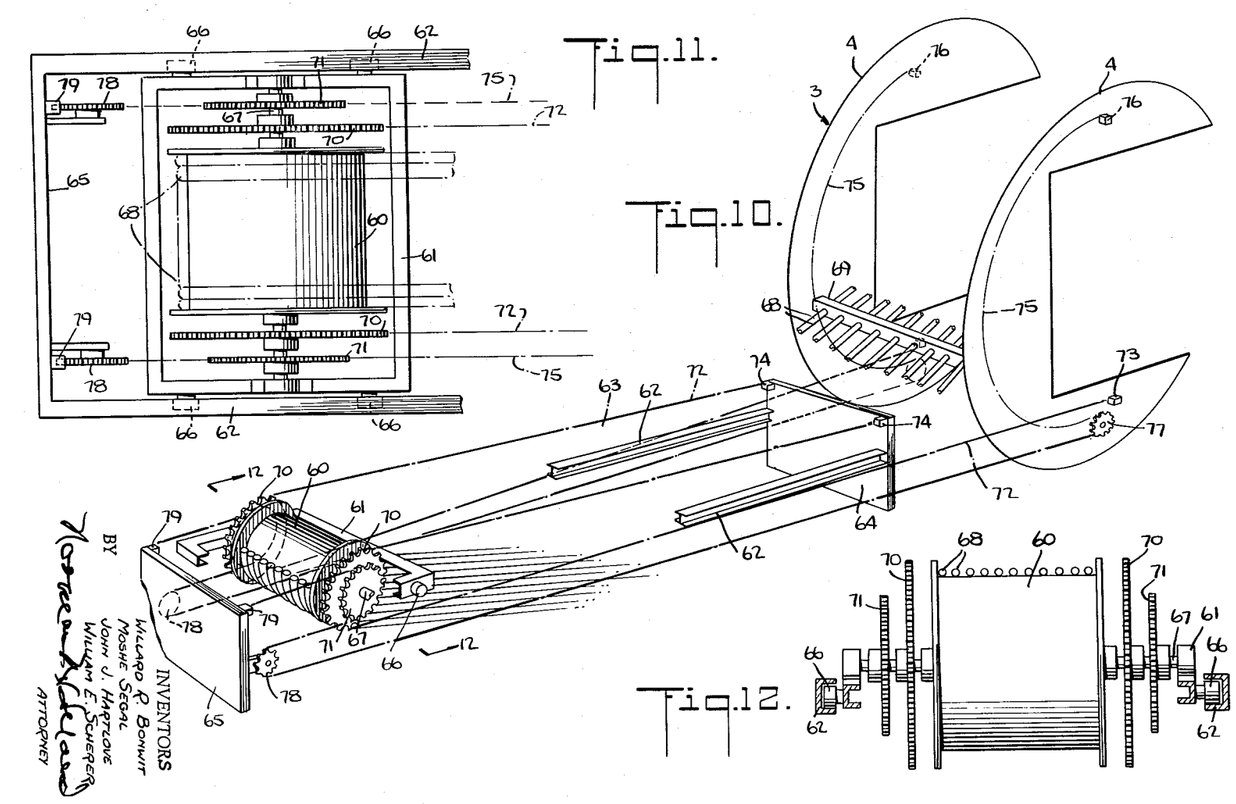
FIG. 10 is a perspective view showing the hose connection retraction and extension mechanism.
FIG. 11 is a top elevational view of the drum and slide carriage used in said retraction and extension mechanism.
FIG. 12 is a sectional view taken along line 12—12 of FIG. 10.
Figure 13:
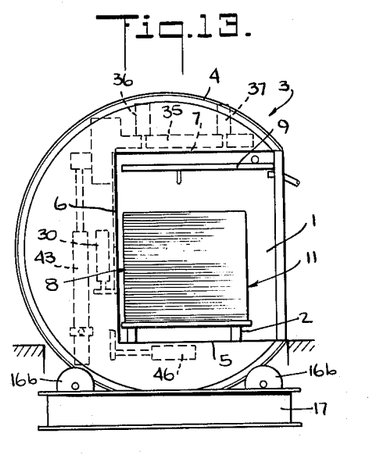
FIG. 13 is a diagrammatic end view showing the initial position of a stack of sheets in the skid inverter.
Figure 14:
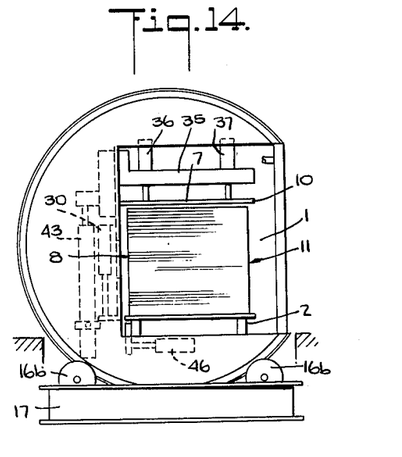
FIG. 14 is a diagrammatic view similar to FIG. 13 showing the position of the top-clamping means in stack-clamping position.

The mechanism for adjusting the length of the various conduits provided to supply the various cylinders with hydraulic fluid is shown in FIGS. 10 through 12.

A drum 60 is rotatably mounted by shaft 67 on a carriage 61 which is slidable by means of rollers 66 in a pair of guide ways 62 mounted on a frame 63 having front and rear walls 64 and 65. A plurality of conduits 68 are wrapped around the drum 60 and are connected at one end (not shown) to a source of fluid (which may be air) and their other ends to the various cylinders on the skid inverter 3. The conduits 68 extend through an anchor bar 69 mounted on skid inverter 3 so that the conduits will be pulled forward with the rotation of skid inverter 3.

The shaft 67 for drum 60 has an inner extension gear 70 mounted thereon on each side of the drum 60 and an outer smaller retracting gear 71 on each side of drum 60.

An extension chain 72 is anchored at one end to an anchor point 73 at the lower end of skid inverter 3, is wrapped around and meshes with the inner extension gear 70, and has its other end fixed to the front wall 64 at anchor point 74. When the skid inverter 3 is rotated to its 90° angle (FIG. 7) the anchor point 73 will pull extension chain 72 forward. This will pull the carriage 61 and its drum 60 forward through the intermediation of extension gears 70 to play out sufficient lengths of conduits 68 needed to compensate for the rotation of skid inverter 3.

A retraction chain 75 is mounted at one end to anchor point 76 in the upper end of the skid inverter 3 and diametrically opposed to anchor point 73 of extension chain 72. The retraction chain 75 is wrapped around spur gear 77 at the lower end of the skid inverter and is also wrapped around a spur gear 78 at the rear wall 65 of the frame. The retraction chain 75 is then meshed with and wrapped around outer retraction gear 71 and has its end anchored to rear walls 65 at anchor point 79. Thus when the skid inverter 3 is rotated back to its original position, the retraction chain 75 is pulled forward by anchor point 76 and the slide carriage 61 and drum 60 is pulled back by spur gears 77 and 78 and retraction gear 71 to take up the slack on the conduits 68.

Hence, the drum 60 is pulled forward when the skid inverter is rotated from 0° to 180° to pay out the necessary additional lengths of conduits 68 needed to compensate for the rotation and the drum 60 is pulled back when the skid inverter 3 is returned to its original position to take up the slack on the conduits 68.

ASSORTED SHEET REMOVING MECHANISM

FIGS. 18 through 21 illustrate a mechanism for separating and removing assorted sheets from the stack 1. These assorted sheets are sheets which have been spoiled in one way or another.

The removing mechanism comprises a pair of U-shaped air forks 80 and 80a which have air conduits 81 connected thereto to supply the forks 80 and 80a with air.

Air arms 82 extend from branches 83 of each air fork and are provided with flattened ends 84 with openings 85 therein to permit air to be ejected therefrom. A suitable valve 86 may be utilized to control the amount of air.

Figure 18:
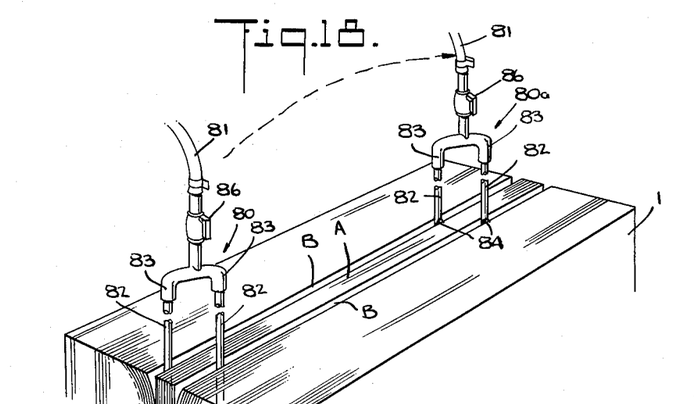
FIG. 18 is a perspective view showing the improved means for separating a group of assorted or defective sheets from the stack.
Figures 19, 20, 21:
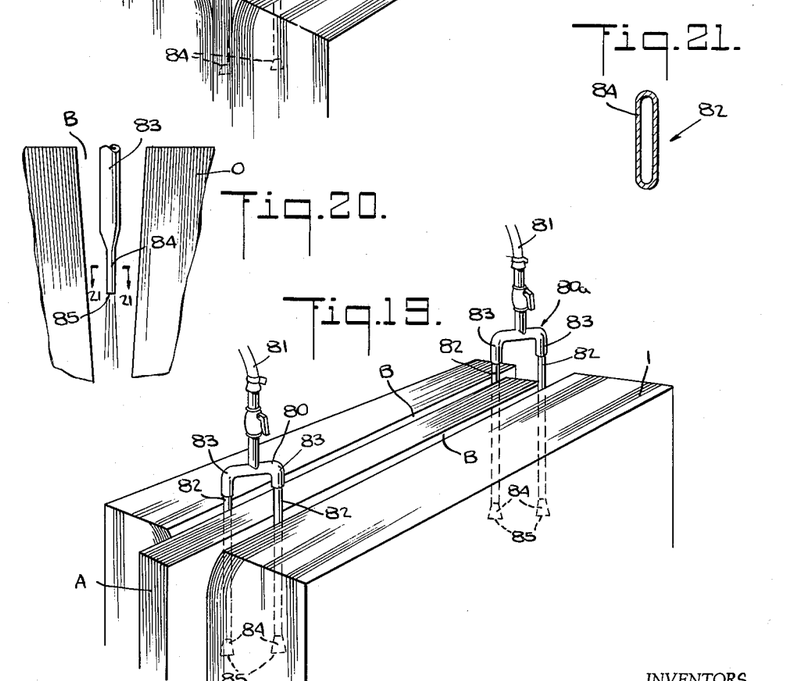
FIG. 19 is a perspective view similar to FIG. 18 showing the group of defective sheets being removed from the stack.
FIG. 20 is a detail showing the defective sheet separating means.
FIG. 21 is a sectional view taken along line 21—21 of FIG. 20.

In operation, the fork 80 is positioned to straddle the group of assorted sheets A which are to be removed. The fork 80 is inserted adjacent one edge of the stack 1. Each arm 82 ejects air from its forward end 85 and separates the assorted sheets A from the rest of the stack by forming a space B between the assorted sheets A and the rest of the stack. The arms 82 are inserted further into the stack as shown in FIGS. 18 and 20 to complete separation of the group of assorted sheets A at one end of the stack 1. Thereafter the second fork 80a is positioned adjacent the first fork 80 with its legs 82 inserted into the spaces B formed by the legs 82 of the first fork 80. The second fork 80a is then moved to the other edge of the stack 70 and its arms 82 pushed down into the stack to the position shown in FIG. 19. At this point the group of assorted sheets A are completely separated from the rest of the stack and may be easily removed without disturbing the rest of the stack 1.

OPERATION

The operation of the present invention will be obvious from the above description. However, it will be summarized hereinbelow for convenience.

A stack 1 of sheets are assembled on a delivery board 32 and the stack 1 is mounted on a skid 2. The skid 2 is then placed into the skid inverter 3 between the upper and lower plates 7 and 5. The skid 2 should be placed in the inverter so the inner edge 8 of the sheets is as close to the back plate 6 as possible.

The safety bars 21 are lowered to the full line position shown in FIG. 7 in order to close the circuit. The lower portion 25 of the back plate 6 is then lowered so that it rests on the delivery board 32. If there is no delivery board, the lower portion 25 should rest on top of skid 2. The skid support channel 45 is then moved inwardly by the cylinder 46 until it rests against the leg of the skid. This prevents the skid from being moved when the stack 1 is rotated 90°.

Figure 2:
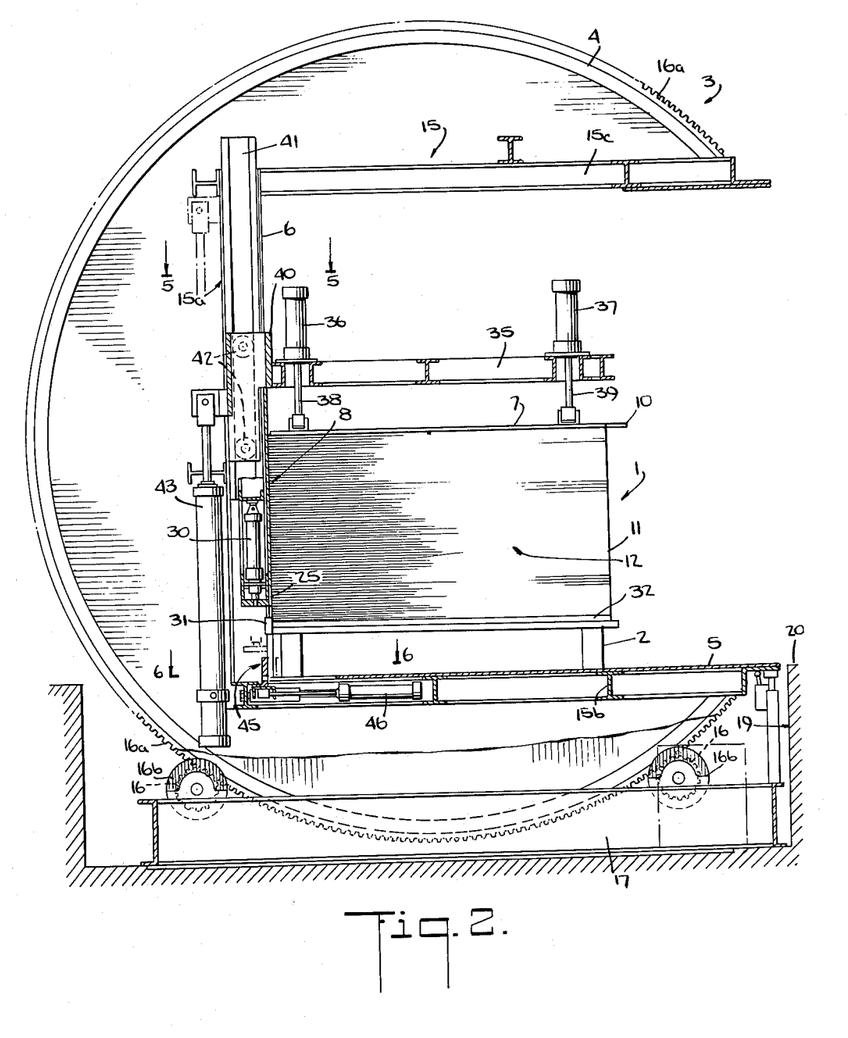
FIG. 2 is a sectional view taken along line 2—2 of FIG. 1.
Figure 3:
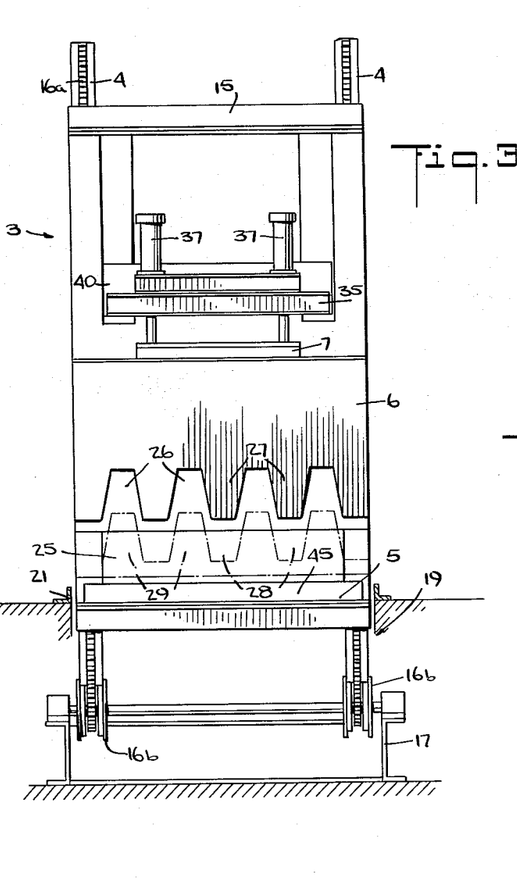
FIG. 3 is a front elevational view of the winding machine.
Figure 4:
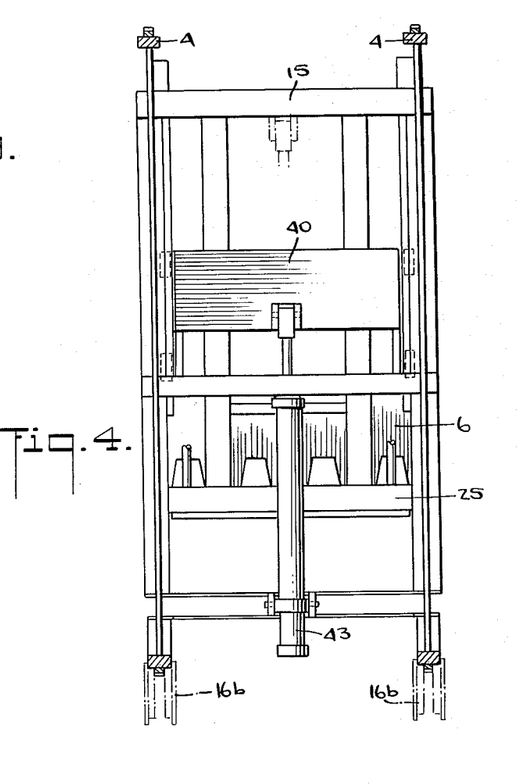
FIG. 4 is a rear elevational view of the winding machine.
Figure 5:
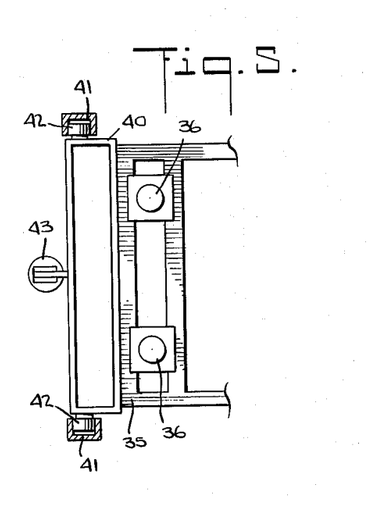
FIG. 5 is a sectional view taken along line 5—5 of FIG. 2.
Figure 6:
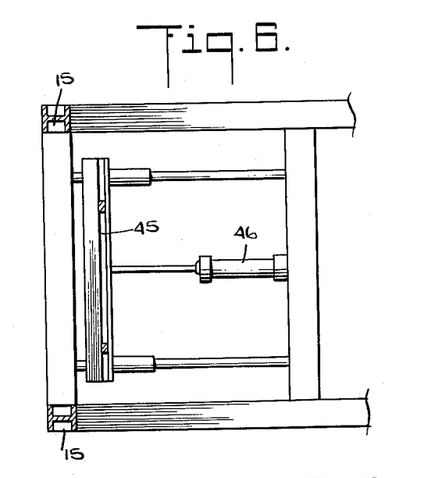
FIG. 6 is a sectional view taken along line 6—6 of FIG. 2.

The movable frame 35 is then lowered by actuation of cylinder 30 to the position shown in FIG. 2 to bring the winding plate 7 close to the stack 1. The cylinders 36 and 37 are then activated so that the winding plate 10 is lowered until it rests on top of the stack 1 with slight pressure.

The skid inverter is then rotated to the 90° position shown in FIG. 7 by rotation of drive gears 16 which mesh with gear racks 16a on rails 4 and permits the skid inverter to rotate. During the rotation of the skid inverter to any position from 0° to 180° the conduit holding block 69 (FIG. 10) is moved forward thus pulling the conduits 68 forward. In order to prevent the conduits from breaking, the conduit extending chain 72 is pulled forward which in turn pulls the slide carriage 61 together with the drum 60 forward through extension gear 70 thereby permitting the conduits 68 to advance to the proper positions without the danger of breakage.

The winding operation is now performed by the winding mechanism 9. The tracks 56 are mounted in the skid inverter between the top frame member 15 and the lower plate 5 of the skid inverter to position the winding mechanism 9 in place. The winding mechanism 9 is moved across the stack of sheets on tracks 56 and ejects air from the top section 51 and the side legs 52 between the sheets to air them.

It is important that the sheets be loose enough for air to enter between the sheets but that they not be so loose as to cause the sheets to buckle severely. This adjustment of the stack 1 is performed by the cylinders 36 and 37 which angle the top winding plate 7 to the desired angle so that sufficient pressure is applied to the stack to prevent buckling but the pressure is not such as to cause the sheets to be held together too tightly.

Thus, in the example shown in the drawing, the winding plate 7 (FIG. 15) may be angled between 2½° to 7½° to the vertical with the outer edge 10 away from the stack so that the outer portion 11 of the stack is loose. In this position, the winding mechanism 9 is passed across the stack to air the outer portion 11 of the stack. In order to wind the central portion 12 of the stack, the winding plate 7 may be moved to a substantially vertical position, as shown in FIG. 16, so that the central portion of the stack is loose. When the winding mechanism 9 is passed thereover air will pass through the central portion 12 to wind this portion. In order to wind the bottom portion 8 of the stack, the winding plate 7 may be reversed so that its outer edge 10 is toward the stack 1 and the plate 7 is at an angle of between 2½° and 7½° to the vertical. The bottom portion 8 of the stack 1 is thus loose and the winding mechanism 9 is again passed over it to wind the bottom portion 8 of the stack 1.

It will, of course, be understood that the angle of the winding plate 7 may vary depending on the characteristics of sheets which make up the stack 1 and that the particular angles recited above need not necessarily be the same in all cases. It may not even be necessary to angle the winding plate 7 at all if the sheets are stiff enough to be loose without buckling. Furthermore, for certain types of sheets, it may be desirable to angle the sheets in one position only and to wind the outer, central and inner portion of the stack without changing the angle of the winding plate.

After the stack 1 has been winded, the assorted or spoiled sheets A may be removed by inserting the U-shaped air fork 80 at one edge of the stack so that its legs 82 straddle the group of assorted sheets A (FIGS. 18 and 19). Air is ejected from the ends 84 of the legs 82 to separate the assorted sheets A from the other sheets in the stack and as the fork is pressed down into the stack each leg 82 will form spaces B between the assorted sheets and the stack. When the fork is inserted for a predetermined distance, a second fork 80a has its legs 82 inserted in the spaces B formed by the legs 82 of the first fork 80 adjacent the first fork 80 and is then moved toward the other end of the stack until they assume the positions shown in FIG. 19. In this position the assorted sheets A may be easily removed without disturbing the rest of the stack.

If the stack 1 is assembled on a delivery board 32, it is desirable to remove the delivery board at this point. The skid inverter is rotated past the 90° position so that the stack will no longer rest on the delivery board 32. The delivery board 32 is then pulled out from beneath the stack. A plurality of spring loaded lugs 31 which snap against the skid, are mounted on back plate extension 25 to prevent the sheets from sliding down when the delivery board is removed.

The edge of the skid 2 is then moved in alignment with the back plate 6 by moving the lower skid support channel 45 inwardly or outwardly by means of the cylinder 46. This will make the edge of the skid 2 even with the inner edge of the stack 8.

The skid is then returned to its upright position by rotating the skid inverter 3 back through a 90° arc. In order to take up the slack in the conduits 68 since the conduit support bar 69 is moved back to its original position, the retracting chain 75 is pulled up by its anchor point 76 on the skid inverter so that the slide 61 and the drum 60 are pulled back by the action of the chain 75 on the retraction gear 71. In this manner the slack in the conduits 68 caused by the return of the skid inverter 3 to its original position is taken up.

The winding plate 7 is then lifted and the stack may be removed by any desired means, such as a lifting fork.

If the stack is to be inverted, an additional skid (not shown) is placed on top of the stack between the clamping plate 7 of the stack 1. The winding plate 7 is then brought down against the second skid to hold the stack in place. The skid inverter is then rotated an additional 90° until the stack is completely inverted and the second skid is now on the bottom. The winding plate 7 is then lowered until the second skid is at floor level. The stack can then be removed in its inverted position.

It will thus be seen that the present invention provides an improved method and mechanism for winding a stack of sheets which does not require manual handling of the sheets so as to give a faster operation. The invention also provides an improved mechanism for inverting a stack of sheets and improved means for removing the press delivery board. The present invention further provides improved means for separating and removing assorted sheets from a stack quickly and without disturbing the rest of the stack.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. The method of winding a stack of sheets in face to face contact with each other which comprises the steps of placing said stack of sheets on edge, relieving the pressure on the portion of the sheets adjacent one edge of the stack, simultaneously applying pressure on the portion of the sheets adjacent the opposite edge thereof, and passing air between the sheets in said stack while said sheets are assembled in stack formation and maintaining said sheets in stack formation in at least partial face to face contact with each other until air has been passed between all of said sheets.

2. The method of winding a stack of sheets as claimed in claim 1, wherein the pressure on the portion of the sheets adjacent the outer edge of the sheets in the stack is relieved, air is then passed between the sheets at said portion of said sheets, the pressure is then relieved on the central portion of the sheets in the stack, air is then passed between the sheets at said central portion, pressure is then relieved on the portion of the sheets adjacent the inner edge of the stack, and air is then passed between the sheets at said portion of the sheets.

3. A skid inverter for winding a stack of sheets in face to face contact with each other which comprises means for placing said stack of sheets on edge, means for relieving the pressure on the portion of the sheets adjacent the outer edge of the sheets in the stack, means for passing air between the sheets at said outer portion, means for relieving the pressure on the central portion of the sheets in the stack, means for passing air between the sheets at said central portion, means for relieving the pressure on the portion of the sheets adjacent the inner edge of the sheets in the stack, and means for passing air between the sheets at said inner portion, said air being passed between said sheets in said stack while said sheets are assembled in stack formation, in at least partial face to face contact with each other.

4. A skid inverter as claimed in claim 3, wherein means are provided for removing assorted sheets from the stack after the stack has been winded, said means comprising a single source of air, a conduit in the form of a fork having legs adapted to straddle said assorted sheets and an opening in said legs to pass air between said assorted sheets and the rest of the sheets in said stack.

5. A skid inverter as claimed in claim 3, wherein said pressure applying means comprises a movable clamping plate for applying pressure to a stack, a back plate, said clamping plate being angularly adjustable relative to said back plate, said back plate having a lower adjustable extension.

6. A skid inverter as claimed in claim 5, wherein the lower edge of said back plate is provided with alternating slots and tongues and wherein said lower extension has alternating slots and tongues adapted to mesh with the slots and tongues of said back plate and wherein said lower extension has a plurality of spring loaded lugs to prevent sheets from slipping down when the press delivery board is removed and wherein said winding mechanism is provided with a movable support channel to control the position of a skid.

7. A skid inverter as claimed in claim 3, wherein said skid inverter is mounted within a pit and wherein a control bar is pivotally mounted and is adapted to act as a foot safety barrier between the pit and skid inverter when in its lower position, said control bar being adapted to close the circuit for operating the skid inverter.

8. A skid inverter as claimed in claim 3, wherein a plurality of hose connections are provided therein, a slide carriage, a drum mounted on said slide carriage, said drum having a retracting gear and an extension gear, a retraction chain mounted on the skid inverter and cooperating with said retraction gear and an extension chain diametrically connected to the skid inverter and cooperating with said extension gear, whereby the rotation of the skid inverter in one direction will move the drum forward to pay out the hose connections and rotation of the skid inverter in the opposite direction will retract the drum to take up the slack.

9. A winding mechanism as claimed in claim 3, wherein said air passing means comprises a U-shaped tube having a base and a pair of leg portions depending therefrom, means for supplying air to said tube, openings along the edge of said tube to eject air therefrom and means on said skirt inverter for supporting said tube and for moving said tube past said stack.

References Cited by the Examiner

UNITED STATES PATENTS

| | | | |
|---|---|---|---|
| 1,259,049 | 3/1918 | Schumacher | 34—150 X |
| 1,668,995 | 5/1928 | Woolever | 34—150 |
| 2,454,762 | 11/1948 | Belluche. | |
| 2,594,373 | 4/1952 | Watson | 271—26 |
| 2,769,557 | 11/1956 | Ohr | 214—1 |
| 2,792,218 | 5/1957 | Van Marle | 271—30 |
| 2,834,384 | 5/1958 | Pearl | 271—89 X |
| 2,865,516 | 12/1958 | Hedderich | 214—1 |
| 2,896,659 | 7/1959 | Erickson | 242—80 |
| 2,984,364 | 5/1961 | Lamb | 214—1 |
| 3,071,258 | 1/1963 | Seigh | 214—1 |

FOREIGN PATENTS

| | | |
|---|---|---|
| 721,948 | 6/1942 | Germany. |
| 874,209 | 4/1953 | Germany. |
| 522,377 | 4/1955 | Italy. |

JOHN J. CAMBY, *Acting Primary Examiner.*

NORMAN YUDKOFF, WILLIAM F. O'DEA, ALDEN D. STEWART, *Examiners.*

D. A. TAMBURRO, *Assistant Examiner.*